No. 821,335. PATENTED MAY 22, 1906.
W. BUTLER.
STAND FOR PHOTOGRAPHIC CAMERAS, TELESCOPES, AND OTHER SCIENTIFIC INSTRUMENTS.
APPLICATION FILED JULY 11, 1905.
3 SHEETS—SHEET 1.
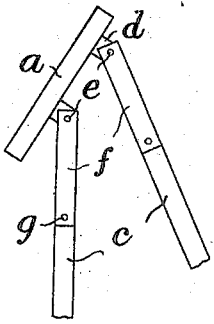
FIG. 5.
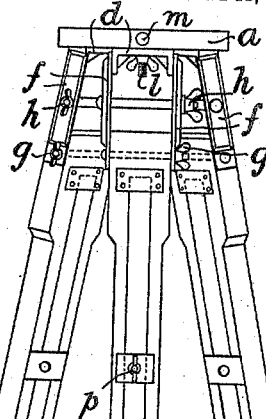
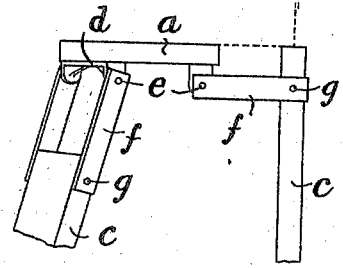
FIG. 7.
FIG. 6.
FIG. 8.
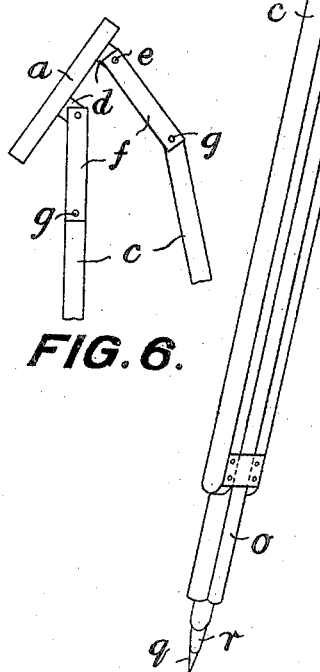
FIG. 1.
Witnesses
L. E. Hicks
E. G. Hicks
Inventor
William Butler
By his attorney
Edward P. Thompson

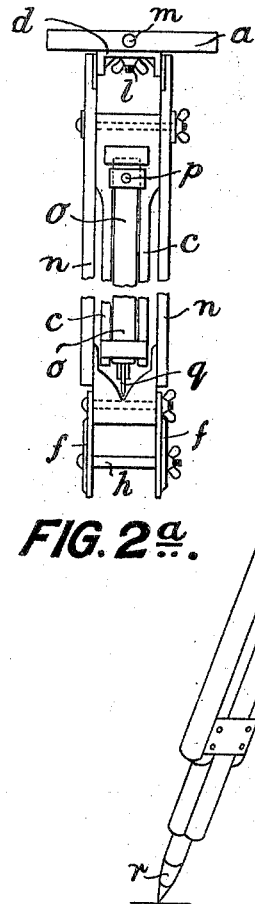
FIG. 2ª.
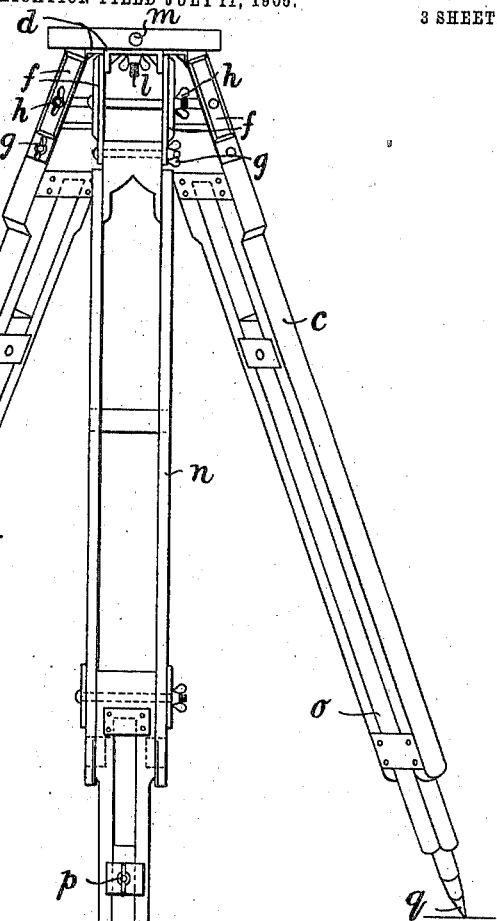
FIG. 2.

No. 821,335. PATENTED MAY 22, 1906.
W. BUTLER.
STAND FOR PHOTOGRAPHIC CAMERAS, TELESCOPES, AND OTHER SCIENTIFIC INSTRUMENTS.
APPLICATION FILED JULY 11, 1905.
3 SHEETS—SHEET 3.
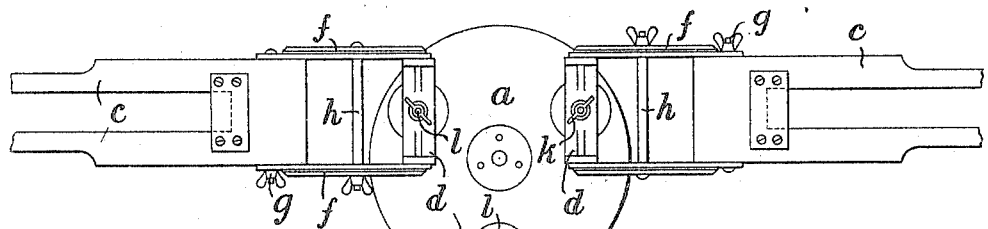
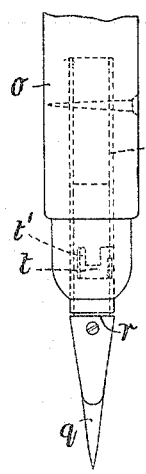
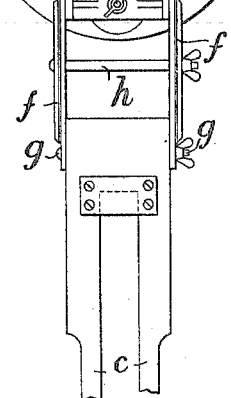
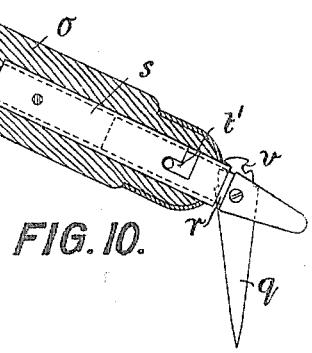
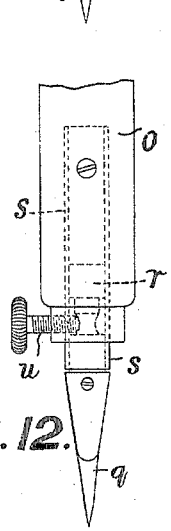
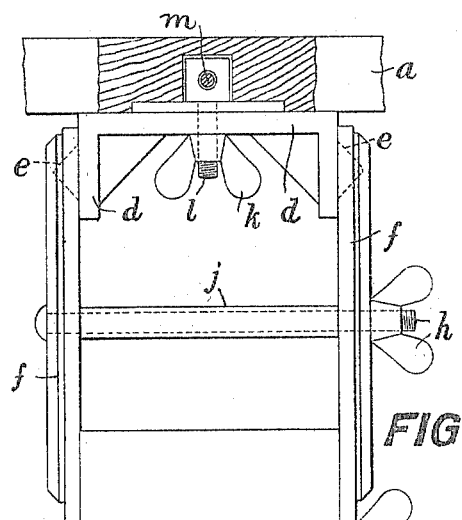
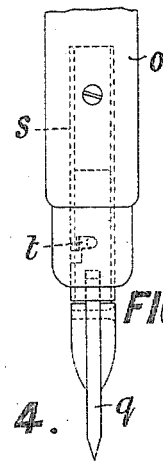
Witnesses
J. E. Hicks
E. G. Hicks
Inventor
William Butler
By his attorney
Edward P. Thompson

UNITED STATES PATENT OFFICE.

WILLIAM BUTLER, OF BIRKDALE, ENGLAND.

STAND FOR PHOTOGRAPHIC CAMERAS, TELESCOPES, AND OTHER SCIENTIFIC INSTRUMENTS.

No. 821,335.     Specification of Letters Patent.     Patented May 22, 1906.

Application filed July 11, 1905. Serial No. 269,273.

*To all whom it may concern:*

Be it known that I, WILLIAM BUTLER, engineers' manager, a subject of the King of Great Britain, residing in Birkdale, Southport, in the county of Lancaster, in the Kingdom of England, have invented certain new and useful Improvements in Stands for Photographic Cameras, Telescopes, and other Scientific Instruments, (for which application has been made in Great Britain, No. 18,718, dated August 30, 1904,) of which the following is a specification.

This invention has for its object improvements in stands for photographic cameras, telescopes, and other scientific instruments whereby the camera or other instrument can be brought to and held at any conceivable angle—that is to say, the lens or instrument can be held at any desired angle relative to the object. It may be held pointing directly upward or downward and the legs can be so arranged that when in the latter of these positions they do not come into the line of vision. The camera or instrument may even be completely inverted.

In order that the invention may be fully understood, reference will now be had to the accompanying drawings, in which the invention is shown as applied to a tripod, and in which—

Figure 1 is a general view of a tripod constructed in accordance with the invention. Fig. 2 is a similar view to Fig. 1, showing, however, one method of using the extension-pieces, which will be hereinafter described. Fig. 2$^a$ is a further view showing an extension-piece with its opposite end to that shown in Fig. 2 secured to the swiveling block. Fig. 3 is an inverted plan view of the tripod-head and attachments with the legs spread out. Fig. 4 is an enlarged view showing the intermediate links, as hereinafter described. Figs. 5, 6, 7, and 8 show as examples various positions to which it is possible to adjust the tripod-head. Figs. 9, 10, 11, and 12 are detail views of the swivel-point attachments fitted on the ends of the legs shown in Figs. 1 and 2.

In carrying out the invention the usual tripod-head $a$ is arranged so as to receive three swiveling blocks $d$, upon which the legs $c$ are capable of pivoting. The method of securing the individual legs $c$ to the swiveling blocks $d$ is as follows: Cone-shaped projections $e$ are provided at the sides of the blocks $d$, and over these projections fit links $f$, which are also suitably connected to the legs $c$ by bolts and winged nuts $g$. Connecting the two links secured to each leg is a further bolt and winged nut $h$, which carries a distance-sleeve $j$ between the links $f$, so as to keep them apart. The swiveling blocks $d$ are secured to the tripod-head $a$ by means of winged nuts $k$, taking over bolts $l$, secured in the tripod-head $a$ by pins or bolts $m$, which pass through the exterior of the tripod-head $a$ and through the heads of the bolts or by other convenient means.

As shown in Fig. 2, it is sometimes desirable to employ an extension-piece, as $n$, which in this case is shown as connected to the links $f$ and to the top of the legs $c$, in connection with which it is used. It will of course be possible to place these extension-pieces on one, two, or all of the legs. Also, if desired, instead of fixing them as shown in the drawings they could be secured direct to the blocks $d$ and the links $f$ secured between their lower ends and the tops of the legs, as shown in Fig. 2$^a$.

The legs are provided with the ordinary sliding pieces $o$, fixed in position by means of winged nuts $p$. At the bottom of the sliding pieces $o$, as above indicated, and shown in Figs. 9, 10, 11, and 12 in detail, a swiveling-point $q$ is used, in order to enable a better grip to be obtained when the legs are spread out to a large extent and under exceptional conditions. This swiveling-point $q$ is mounted in a sliding holder $r$, which itself is adjustable in a hollow tube $s$, mounted in the sliding piece $o$ of the legs. In Figs. 9, 10, and 11 the holder $r$ is shown as connected to the tube $s$ by means of a bayonet-joint $t$, with an additional vertical slot $t'$, while in Fig. 12 a set-screw device $u$ is employed. In order to permit the swiveling-point $q$ to be turned at an angle to the leg, in the case of the bayonet-joint, it is simply necessary to take the point, as shown in Fig. 11, and to turn it, and therefore also the holder $r$, round somewhat in the tube $s$ from right to left and then draw it down a small extent, so that the pin on the holder $r$ passes down the vertical slot of the bayonet-joint, and turn it again somewhat, when said point $q$ can be turned about its pivot so as to bring one or other of the recesses $v$ in a line with the lower end of the tube $s$, so that this lower end will engage in one of the recesses $v$ when the holder $r$ is moved up the tube $s$ again and the pin of the bayonet-joint at the same time enters the vertical slot $t'$ in the tube $s$, the point $q$ being thus held in position.

In the modification shown in Fig. 12 the action will be obvious. The set-screw $u$ is slackened and the holder $r$ allowed to come out to a certain extent. The point is then turned and the holder $r$ moved back again somewhat, so that one of the recesses $v$ engages on the end of the tube $s$, after which when the point $q$ has been turned to the angle required the set-screw is again tightened up.

Figs. 5 to 8 show some typical positions into which the tripod-head $a$ can be placed, enabling the camera to be held at the various angles shown as examples. In Fig. 6 it will be obvious that the angle between the link and the leg at $g$ will enable the tripod-head $a$ to be turned to a very steep angle and yet will not necessitate the bottom ends of the legs covering a very large area. In Fig. 7 one pair of the links $f$ is shown as turned at right angles to the leg $c$, which is vertical and immediately under the extended front of the camera. (Shown in dotted lines.) A firm support of this nature is very desirable when the camera front is much extended, especially when provided with telephoto or other heavy lenses. Fig. 8 shows the tripod-head $a$ in a vertical position. In this position it will be obvious that the front legs $c$ can be brought practically parallel to one another, turning by means of their respective swivel-blocks $d$.

The main advantages of this improved tripod-stand shortly set forth may be expressed as follows: It is possible to place the tripod-head $a$ at any angle desired, while the legs $c$ can be held at any suitable angle the one relative to the other—that is to say, it is not necessary that in plan view they should always be at an angle of one hundred and twenty degrees the one relative to the other, as in the usual tripod. This is specially useful when such positions as shown in Figs. 5, 6, and 8 are used, as otherwise in order to get the steep inclination of the tripod-head shown it would be necessary to spread out the front legs of the camera so as to occupy a great amount of ground. In fact, the position shown in Fig. 8 could not be attained without the swiveling blocks $d$. Further, the links at the top of the legs make for economy of space in an instance such as shown in Fig. 6 and also enable difficulties which are often felt, owing to the unevenness of the ground, to be overcome, as by their means the angle which the legs make with the vertical can be varied within very large limits without entailing loss of rigidity. The camera (or other instrument) may be adjusted in elevation to a certain extent by means of the side links $f$ without disturbing the position of the legs $c$ or swivel-point attachments at the ends of same when once arranged. By means of the swivel-point attachments at the ends of the legs the slipping of the tripod is obviated when working on rock or other smooth surfaces, as the points may be placed under all circumstances approximately perpendicular to their supports, (the ground, wall, tree, &c.,) and in the case of the arrangement shown in Fig. 12 quite irrespective of the position the legs may be in in relation to the tripod-head $a$.

I declare that what I claim is—

1. In a stand for the purposes specified, a head, a plurality of links, universal joints connecting said head to the respective links, and a leg pivoted to each link.

2. In a stand for the purposes specified, a head, a plurality of links, universal joints located entirely below the lower surface of said head and connecting said head to the respective links, as many legs as there are links, and pivot-joints between the links and the upper ends of the respective legs, the pivot for each leg being transverse to one of the axes of the universal joint of the same leg.

3. In a stand for the purposes specified a head, a plurality of blocks adapted to swivel on and secured to said head, links secured to said blocks, said blocks and links being provided with cones and corresponding recesses, means for tightening said blocks and links the one relative to the other, legs secured to said links, and means for gripping the ground on the ends of said legs.

4. In a stand for the purposes specified, a head, recesses on the under side of said head, a plurality of blocks adapted to swivel, a pin for each of said blocks, a head on each of said pins, further pins adapted to secure the heads of said pins to the head, nuts adapted to secure each of said blocks to said pin, links secured to each of said blocks, legs secured to said links, and means for gripping the ground on each of said legs.

5. In a stand for the purposes specified, a head, a plurality of blocks adapted to swivel on and secured to said head, links secured to said blocks, bolts and nuts for tightening each pair of said links relative to said blocks, a distance-piece on said bolts, legs secured to and adapted to turn relative to said links, and means for gripping the ground on the ends of said legs.

6. In a stand for the purposes specified, a head, a plurality of blocks respectively pivoted to said head, links pivoted to said blocks, and legs whose upper ends are pivoted to said links.

7. In a stand for the purposes specified, a head, a plurality of blocks respectively pivoted to said head, links pivoted to said blocks, legs whose upper ends are pivoted to said links, and feet pivoted to the lower ends of said legs.

8. In a stand for the purposes specified, a head, a plurality of blocks adapted to swivel on and secured to said head, legs, means pivotally connecting said blocks and legs for permitting the upper end of each leg to swing in an arc relative to its respective block in a plane parallel to the base of the head, and a pivoting-point on the ends of said legs.

9. In a stand for the purposes specified, a head, a plurality of legs each adapted to turn in a plane parallel to said head, a tube in the end of said legs, a holder adapted to slide in said tube, a pivoting-point adapted to pivot in said holder and provided with recesses in its head.

10. In a stand for the purposes specified, a head, legs secured to said head and capable of being turned in a plane parallel to said head and to swing in a plane at right angles to said head, a pivoting-point on the end of each of said legs, and means for holding said pivoting-point at an angle to said legs.

11. In a stand for the purposes specified, a head, legs secured to said head and adapted to be turned in a plane parallel with said head and to be moved in an arc about their point of attachment to said head, a sliding piece connected to each of said legs, and means for gripping the ground on the end of said legs.

12. In a stand for the purposes specified, a head, a plurality of pivots projecting downward from the under side of said head, blocks rotary on said pivots, pivot-pins on the respective blocks and at right angles to said pivots, links supported at one end by said pivot-pins, pivots at the other ends of said links parallel to said pivot-pins, and legs whose upper ends are respectively pivoted to the last-named pivots, and clamps for the first and last pivots.

13. In a stand for the purposes specified, a head, a plurality of blocks adapted to swivel on and secured to said head, links secured to each of said blocks, legs, extension-pieces adapted to be secured intermediate said head and said legs, a socket in the end of each of said legs, a sliding holder in each of said sockets, a pivoting-point in each of said holders, means for securing said pivoting-points both in alinement with and at an angle to their respective legs.

14. In a swiveling-point for the purposes specified, a socket, a sliding holder capable of longitudinal movement in said socket, a pivoting-point in said holder, means for securing said point in alinement with and at an angle to said socket.

15. In a stand for the purposes specified, a head, legs secured to said head, a holder-piece adapted to slide in each of said legs and guided by a bayonet-joint, a pivotal point in each of said holder-pieces, each provided with recesses in their respective heads, means on said legs for engaging the recesses of said points.

16. In a stand for the purposes specified, a pivotal point provided with recesses in its head a sliding holder for said point, a socket adapted to receive said sliding holder, a projecting edge on said socket adapted to be engaged by one of the recesses in the head of the point in the highest position of said holder and in the inclined position of said point, means for holding said holder in its inner position relative to said socket.

17. In a swiveling-point for the purposes specified, a socket, a holder capable of being turned in and of sliding in said socket a pivotal point in said holder means for securing said point in alinement and at an angle to said socket.

In witness whereof I have hereunto signed my name, this 29th day of June, 1905, in the presence of two subscribing witnesses.

WILLIAM BUTLER.

Witnesses:
   JOHN LONGTON LOWE,
   HUBERT PUMPHREY.